US012657193B1

(12) United States Patent
Sun et al.

(10) Patent No.: US 12,657,193 B1
(45) Date of Patent: Jun. 16, 2026

(54) METHOD TO ORGANIZE FILE STORAGE BASED ON SEMANTIC SEARCH HISTORY

(71) Applicant: Sandisk Technologies, Inc., Milpitas, CA (US)

(72) Inventors: Chao Sun, San Jose, CA (US); Muqing Liu, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 11 days.

(21) Appl. No.: 18/983,225

(22) Filed: Dec. 16, 2024

(51) Int. Cl.
*G06F 16/2457* (2019.01)
*G06F 16/22* (2019.01)
*G06F 16/245* (2019.01)

(52) U.S. Cl.
CPC .... *G06F 16/24573* (2019.01); *G06F 16/2237* (2019.01); *G06F 16/24569* (2019.01)

(58) Field of Classification Search
CPC .......... G06F 16/24573; G06F 16/2237; G06F 16/24569
See application file for complete search history.

(56) References Cited

U.S. PATENT DOCUMENTS

| | | | | | |
|---|---|---|---|---|---|
| 8,972,397 | B2 | | 3/2015 | Imig | |
| 11,216,459 | B2 | | 1/2022 | Zhang | |
| 11,782,920 | B1 | * | 10/2023 | Wang | ................ G06F 16/24542 |
| | | | | | 707/718 |
| 2009/0216936 | A1 | * | 8/2009 | Chu | .................... G06F 12/0246 |
| | | | | | 711/E12.008 |

| | | | | | |
|---|---|---|---|---|---|
| 2012/0246403 | A1 | * | 9/2012 | McHale | ................ G06F 3/0604 |
| | | | | | 711/114 |
| 2014/0019677 | A1 | * | 1/2014 | Chang | ................. G06F 12/0804 |
| | | | | | 711/143 |
| 2014/0188870 | A1 | * | 7/2014 | Borthakur | ............... G06F 16/22 |
| | | | | | 707/736 |
| 2015/0186047 | A1 | * | 7/2015 | Shank | ..................... G06F 3/065 |
| | | | | | 711/104 |
| 2015/0193155 | A1 | * | 7/2015 | Sarcone | ................ G06F 3/0688 |
| | | | | | 714/764 |
| 2015/0212943 | A1 | * | 7/2015 | Yang | ................... G06F 12/0862 |
| | | | | | 711/137 |

(Continued)

OTHER PUBLICATIONS

U.S. Appl. No. 18/440,263, filed Feb. 13, 2024, Chao Sun.

(Continued)

*Primary Examiner* — William P Bartlett
(74) *Attorney, Agent, or Firm* — Arlene Neal; NEAL BLIBO LLC

(57) ABSTRACT

A storage device organizes data on different storage media based on access history and user behavior to accelerate data retrieval. The storage device includes a first storage media and a second storage media to store the data. The second storage media may be accessed faster than the first storage media. A controller on the storage device executes a first data retrieval to identify hot blocks in the first storage media based on the access history. The controller also executes a second data retrieval to identify the hot blocks in the first storage media based on a semantic search. The controller may prefetch the hot blocks from the first storage media, cache the prefetched hot blocks in the second storage media and/or move the hot blocks from a slower storage medium to a faster storage medium.

20 Claims, 7 Drawing Sheets

(56)      References Cited

U.S. PATENT DOCUMENTS

| | | | |
|---|---|---|---|
| 2016/0147461 A1* | 5/2016 | Fan ..................... | G06F 16/2282 |
| | | | 711/104 |
| 2021/0248136 A1* | 8/2021 | Panuganty ........... | G06F 16/972 |
| 2022/0100664 A1* | 3/2022 | Ahmad ............... | G06F 12/0811 |
| 2022/0261152 A1* | 8/2022 | Jude ...................... | G06F 3/0631 |
| 2023/0107660 A1* | 4/2023 | Rushing ............. | G06F 12/1027 |
| | | | 711/118 |
| 2024/0119055 A1 | 4/2024 | Sun | |
| 2024/0168978 A1* | 5/2024 | Goel ................... | G06F 16/2237 |
| 2025/0245249 A1* | 7/2025 | Thunuguntla ......... | G06F 40/284 |

OTHER PUBLICATIONS

U.S. Appl. No. 18/449,116, filed Aug. 14, 2023, Chao Sun.
U.S. Appl. No. 18/449,165, filed Aug. 14, 2023, Chao Sun.
Jinhao Zhu, Liana Patel, Matei Zaharia, Raluca Ada Popa; Compass: Encrypted Semantic Search with High Accuracy; pp. 1-27.
Sungmin Park, Dongwook Kim, Anho Ki, Sooyong Kang; SMFS: Semantic Multimedia Filesystem for Mobile Multimedia Devices; The 1st IEEE Global Conference on Consumer Electronics 2012; pp. 368.

* cited by examiner

FRAMES

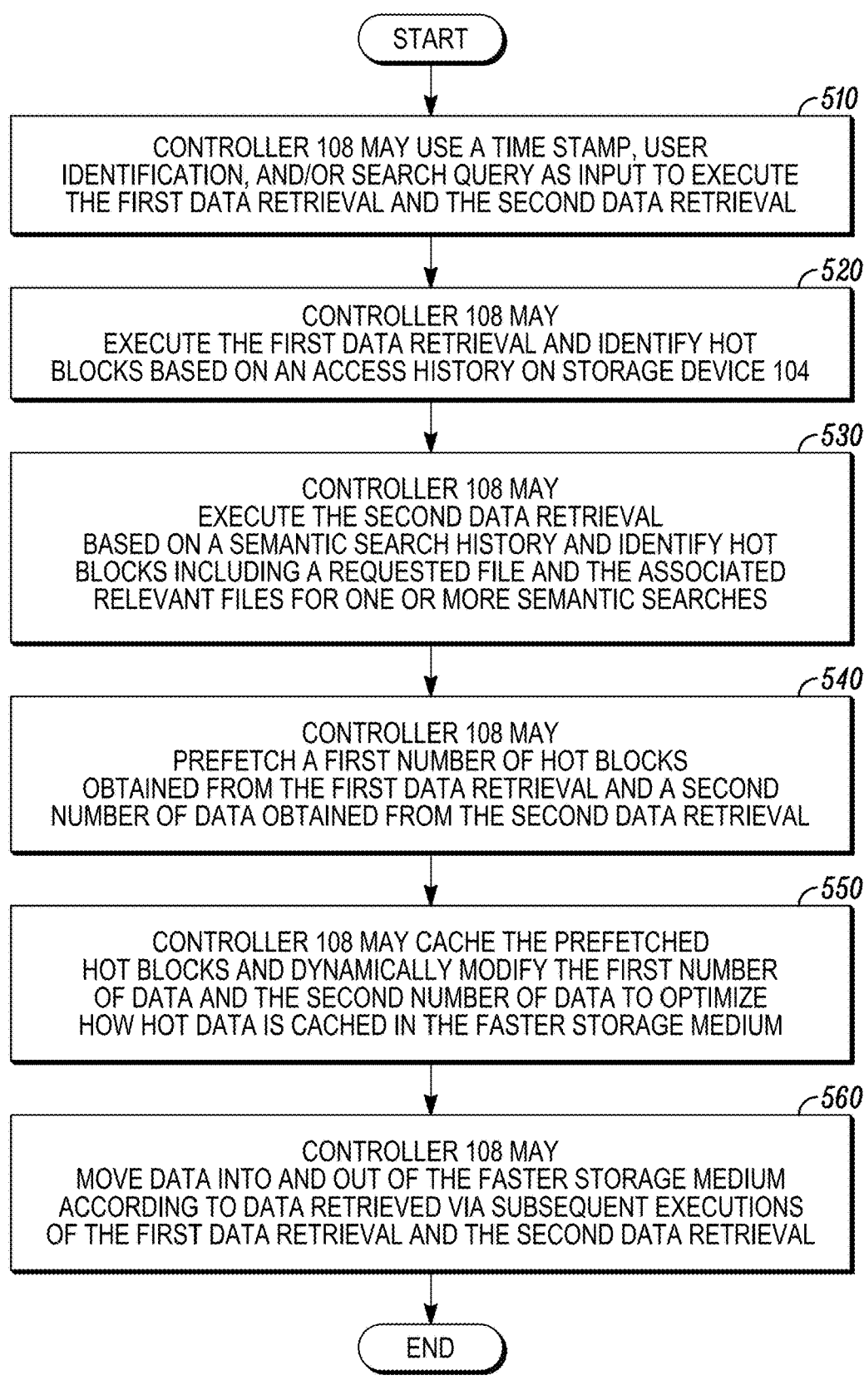

START

*510*

CONTROLLER 108 MAY USE A TIME STAMP, USER IDENTIFICATION, AND/OR SEARCH QUERY AS INPUT TO EXECUTE THE FIRST DATA RETRIEVAL AND THE SECOND DATA RETRIEVAL

*520*

CONTROLLER 108 MAY EXECUTE THE FIRST DATA RETRIEVAL AND IDENTIFY HOT BLOCKS BASED ON AN ACCESS HISTORY ON STORAGE DEVICE 104

*530*

CONTROLLER 108 MAY EXECUTE THE SECOND DATA RETRIEVAL BASED ON A SEMANTIC SEARCH HISTORY AND IDENTIFY HOT BLOCKS INCLUDING A REQUESTED FILE AND THE ASSOCIATED RELEVANT FILES FOR ONE OR MORE SEMANTIC SEARCHES

*540*

CONTROLLER 108 MAY PREFETCH A FIRST NUMBER OF HOT BLOCKS OBTAINED FROM THE FIRST DATA RETRIEVAL AND A SECOND NUMBER OF DATA OBTAINED FROM THE SECOND DATA RETRIEVAL

*550*

CONTROLLER 108 MAY CACHE THE PREFETCHED HOT BLOCKS AND DYNAMICALLY MODIFY THE FIRST NUMBER OF DATA AND THE SECOND NUMBER OF DATA TO OPTIMIZE HOW HOT DATA IS CACHED IN THE FASTER STORAGE MEDIUM

*560*

CONTROLLER 108 MAY MOVE DATA INTO AND OUT OF THE FASTER STORAGE MEDIUM ACCORDING TO DATA RETRIEVED VIA SUBSEQUENT EXECUTIONS OF THE FIRST DATA RETRIEVAL AND THE SECOND DATA RETRIEVAL

END

METHOD TO ORGANIZE FILE STORAGE BASED ON SEMANTIC SEARCH HISTORY

BACKGROUND OF THE INVENTION

A storage device may be communicatively coupled to a host and to non-volatile memory including, for example, a NAND flash memory device on which the storage device may store data received from the host. The memory device may include multiple dies which may be divided into physical blocks and the storage device may store data in blocks on the memory device. Data may be stored in the blocks in various formats, with the formats being defined by the number of bits that may be stored per memory cell. For example, a single-level cell (SLC) format may write one bit of information per memory cell, a multi-level cell (MLC) format may write two bits of information per memory cell, a triple-level cell (TLC) format may write three bits of information per memory cell, a quadruple-level cell (QLC) format may write four bits of information per memory cell, and so on. The format used to store fewer bits of information per memory cell may be accessed faster than a format used to store more bits of information per memory cell.

Data may be stored on the memory device in an unstructured manner. For example, unstructured data may be stored as an image, a video, audio, text files, or the like in chunks on blocks in the memory device. To accelerate data access, the storage device may use, for example, a block level caching algorithm to prefetch frequently accessed and/or recently used blocks from a persistent memory device and cache the frequently accessed and/or recently used blocks in a faster accessed medium such as a random-access-memory (RAM) on the storage device. The storage device may also move frequently accessed and/or recently retrieved blocks from a slower storage medium, for example, MLC memory, to a faster storage medium, for example, SLC memory. In some cases, the storage device may also accelerate data access using a file access hint sent from a top layer such as an application or file system. The top layer may pass the file access hint to the storage device to inform the storage device of which file the application may access more frequently. Based on the file access hint, the storage device may organize data storage for faster access by moving data associated with the hint from a slower storage medium to a faster storage medium or by prefetching the data from the persistent memory and caching the prefetch data in a faster storage medium.

Artificial intelligence (AI) embedding modelling may be employed to convert unstructured data into vectors, wherein a vector may represent a specific attribute or feature of the data. The vectors may be used in AI applications to represent input and output data in large language models (LLM), thereby allowing the models to learn patterns, make predictions, and provide insights. A semantic search may be used to search a vector database. Semantic searching may be performed by providing, for example, text, image, or audio, as opposed to looking up a file by date or tags as is currently performed in non-semantic searches. When a semantic search is performed, the LLM may retrieve the data searched for and related/relevant data based on vector similarities.

The currently used caching algorithms employed by the storage device may not identify relevant data that may be retrieved through a semantic search. For example, if a user performs a semantic search for a person on a first beach, the LLM may return a photo of the person on the first beach and relevant data including other photos of the person on other beaches or other photos of the person. If the relevant data was not recently used and/or frequently accessed or provided to the storage device as a file access hint, the current caching algorithms may not prefetch and cache the relevant data, potentially reducing the performance of the storage device. There is currently no method for organizing the file storage based on user behavior.

SUMMARY OF THE INVENTION

In some implementations, a storage device may organize data on different storage media to accelerate data retrieval on the storage device. The storage device may organize data based on access history and user behavior. The storage device may include a first storage media to store data in a persistent state and a second storage media to cache the data. The second storage media may be accessed faster than the first storage media. A controller on the storage device may execute a first data retrieval to identify hot blocks in the first storage media based on the access history. The controller may also execute a second data retrieval to identify the hot blocks in the first storage media based on a semantic search. The controller may prefetch the hot blocks identified using the first data retrieval and the second data retrieval from the first storage media. The controller may cache the prefetched hot blocks in the second storage media and/or move data retrieved using the first data retrieval and the second data retrieval from a slower storage medium to a faster storage medium.

In some implementations, a method is provided for organizing data on different storage media to accelerate data retrieval on the storage device. The method includes executing a first data retrieval to identify hot blocks in a first storage media based on an access history and executing a second data retrieval to identify the hot blocks in the first storage media based on a semantic search. The method also includes prefetching the hot blocks identified using the first data retrieval and the second data retrieval from the first storage media. The method further includes caching data the prefetched hot blocks in a second storage media that is accessed faster than the first storage media and/or moving data retrieved using the first data retrieval and the second data retrieval from a slower storage medium to a faster storage medium.

In some implementations, a method is provided for organizing data on different storage media to accelerate data retrieval on a storage device. The method includes executing a first data retrieval to identify hot blocks in a first storage media based on an access history and executing a second data retrieval to identify the hot blocks in the first storage media based on a semantic search. The method also includes prefetching the hot blocks identified using the first data retrieval and the second data retrieval from the first storage media. The method further includes caching a first amount of data from the first data retrieval and a second amount of data from the second data retrieval in a second storage media that is accessed faster than the first storage media and/or moving data retrieved using the first data retrieval and the second data retrieval from a slower storage medium to a faster storage medium. The method also includes dynamically adjusting the first amount of data and the second amount of data being cached in the second storage media.

3

Figure 2:
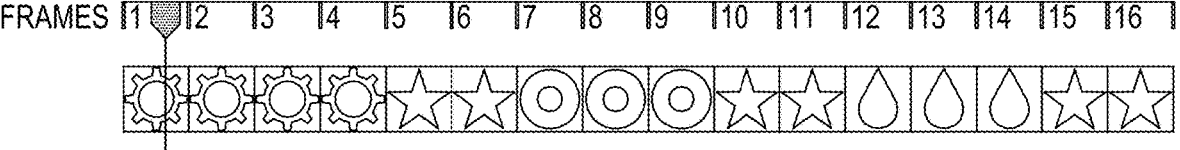

FIG. 2 is a block diagram of a file on which semantic caching may be performed in accordance with some implementations.

Figure 3:
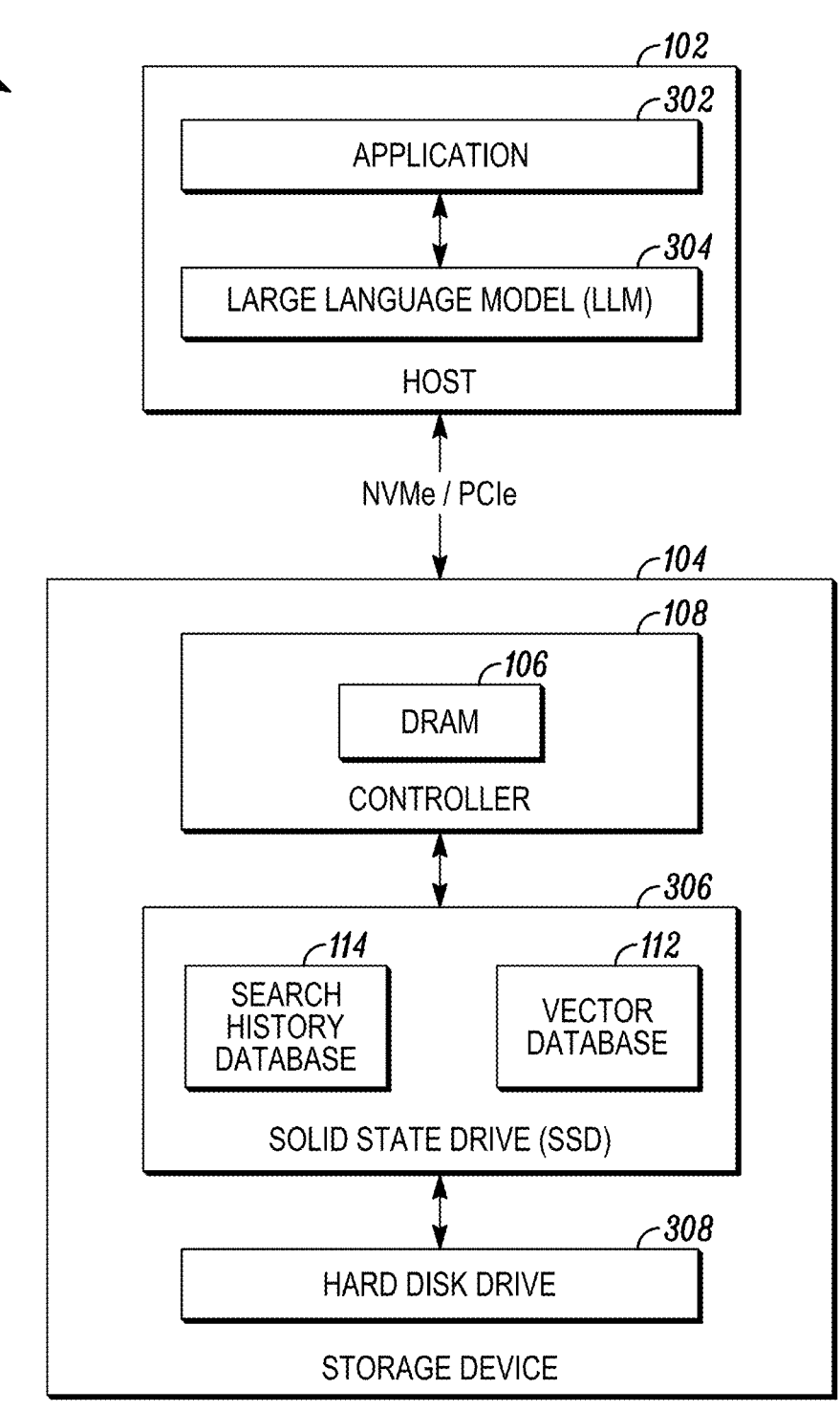

FIG. 3 is an example block diagram of a system including different storage media that may be organized according to an access history and user behavior in accordance with some embodiments.

Figure 4:
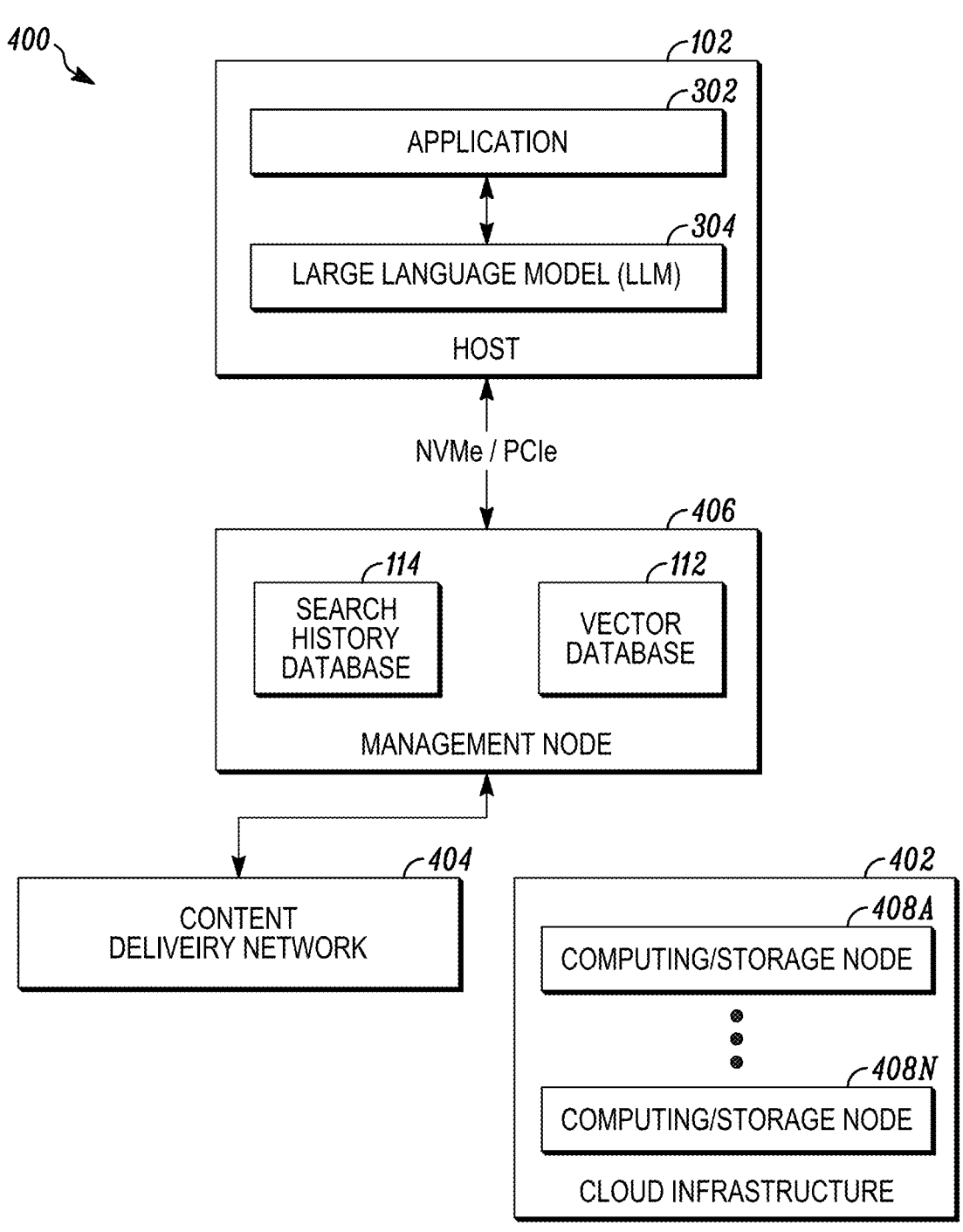

FIG. 4 is another example block diagram of a system including different storage media that may be organized according to an access history and user behavior in accordance with some embodiments.

Figure 6:
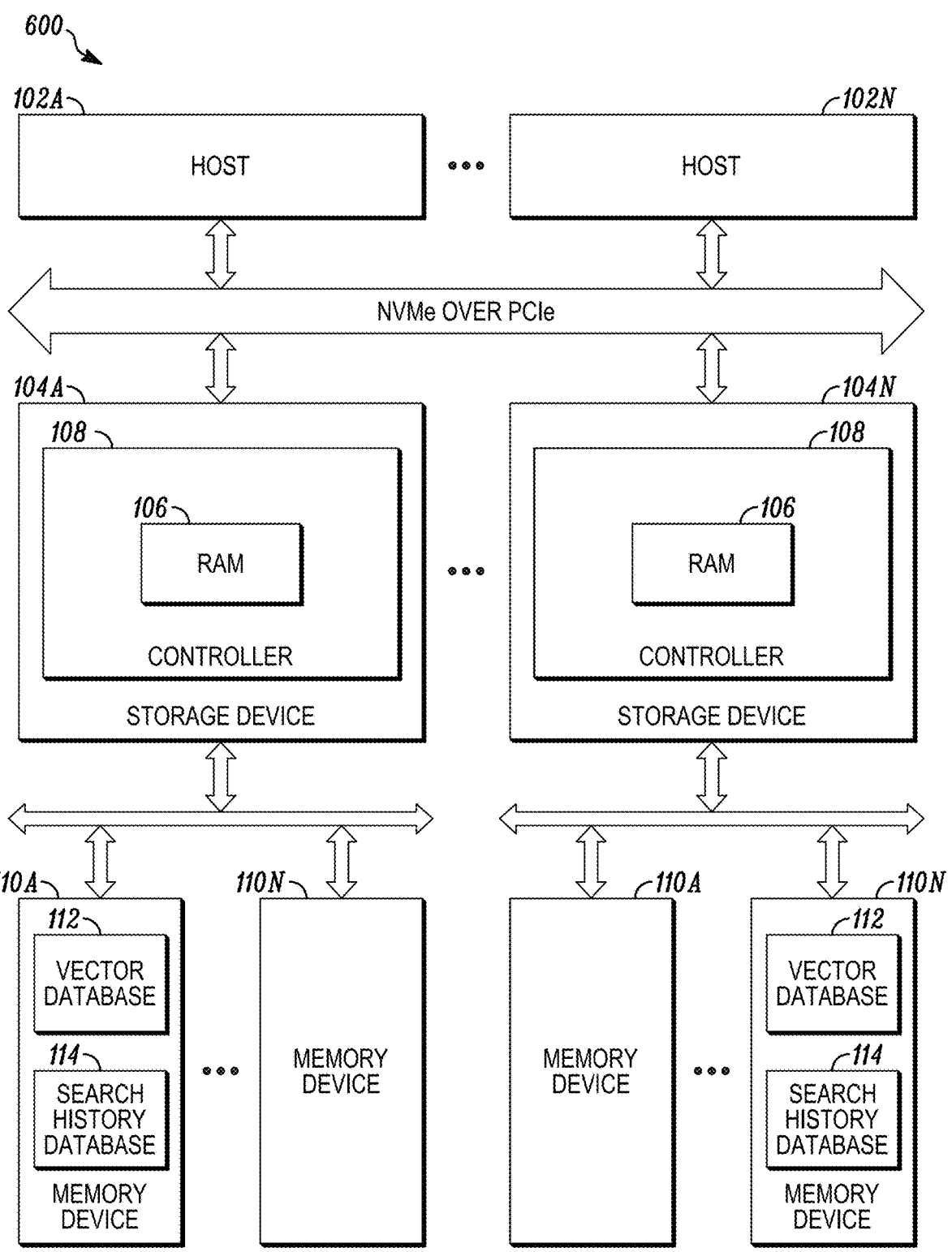

FIG. 5 is an example flow diagram for organizing how files are stored on various storage media using block level data retrieval and semantic data retrieval in accordance with some implementations FIG. 6 is a diagram of an example environment in which systems and/or methods described herein are implemented.

Figure 1:
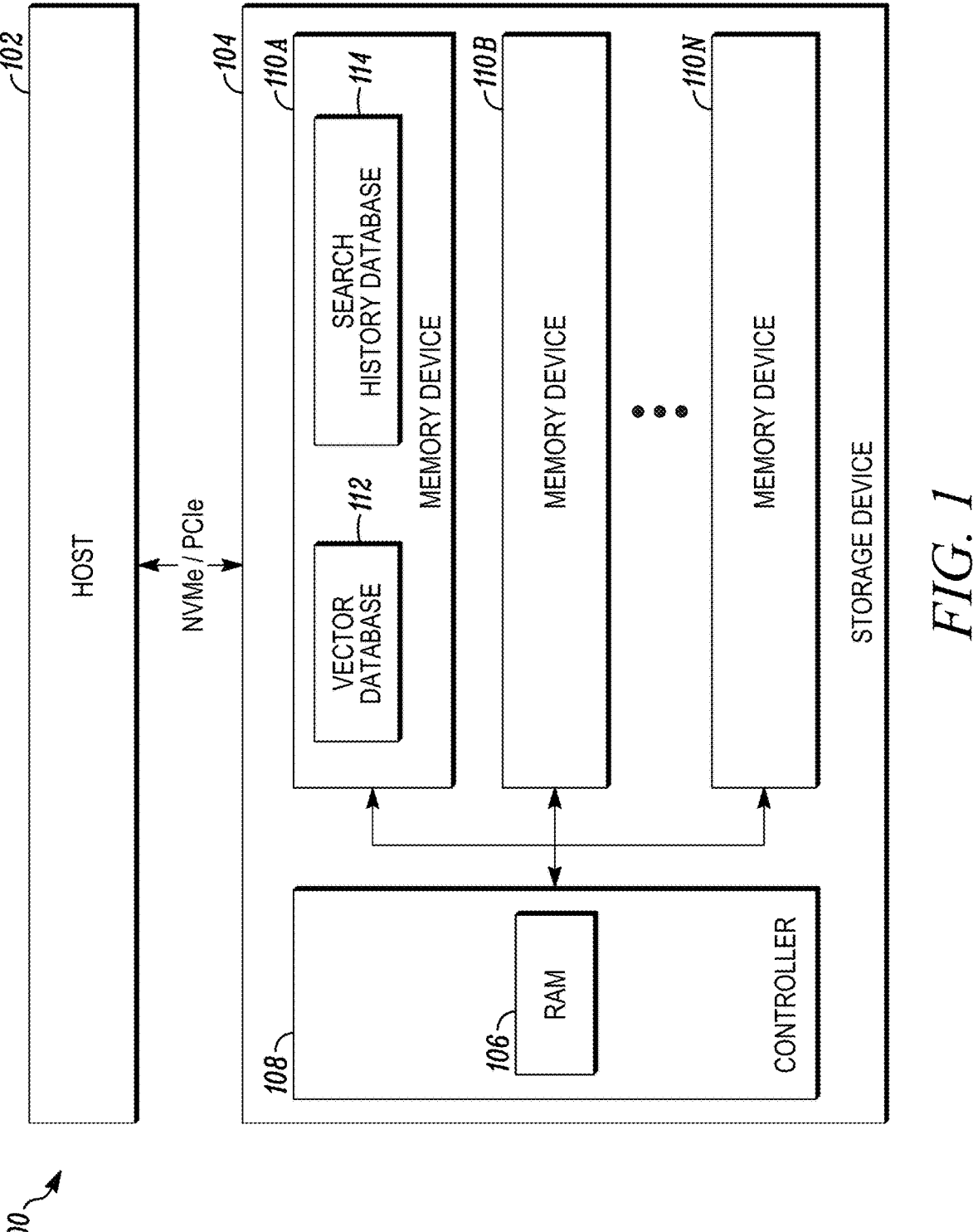
FIG. 1 is a schematic block diagram of an example system in accordance with some implementations.
Figure 7:
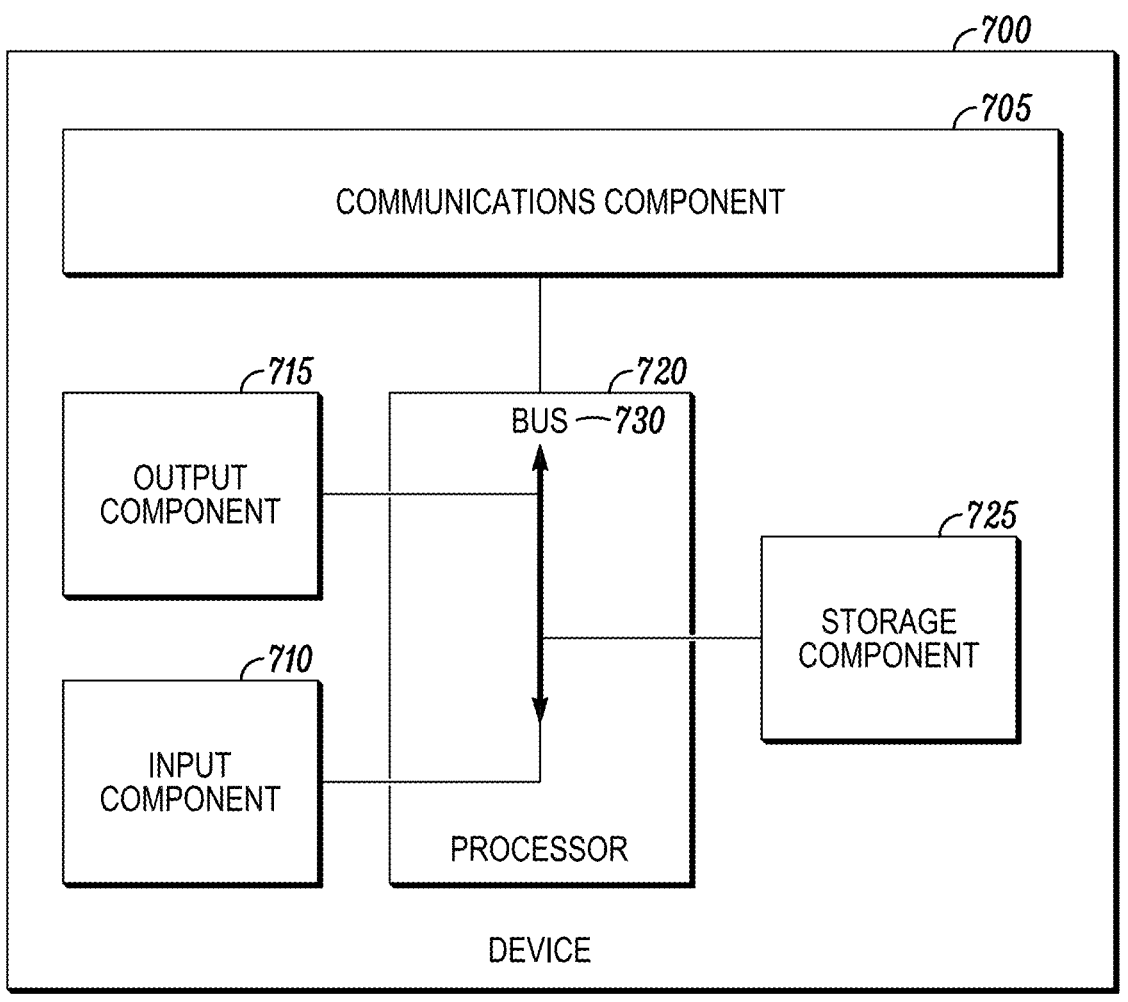

FIG. 7 is a diagram of example components of one or more devices of FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 may transmit commands to read data from or write data to storage device 104. Host 102 may be used to execute one or more applications to receive an input for a semantic search and host 102 may execute a large language module (LLM) to perform the semantic search. Host 102 and storage device 104 may be in the same physical location as components on a single computing device or on different computing devices that are communicatively coupled. Storage device 104, in various implementations, may be disposed in one or more different locations relative to the host 102 and storage device 104 may communicate with host 102 over a peripheral component interconnect express (PCIe) protocol and the like. Host 102 may include additional components (not shown in this figure for the sake of simplicity).

Storage device 104 may include a random-access memory (RAM) 106, a controller 108, and one or more non-volatile memory devices 110a-110n (referred to herein as the memory device(s) 110). Storage device 104 may be, for example, a solid-state drive (SSD). RAM 106 may be static RAM (SRAM) or dynamic RAM (DRAM) that may be used to cache information used on storage device 104.

Controller 108 may interface with host 102 and process foreground operations including instructions transmitted from host 102. For example, controller 108 may read data from and/or write to memory device 110 based on instructions received from host 102. Controller 108 may also execute background operations to manage resources on memory device 110. For example, controller 108 may execute garbage collection, read refresh, and other relocation functions per internal relocation algorithms to refresh, recycle, and/or relocate the data on memory device 110.

Memory device 110 (also referred to herein as a first storage media) may be flash based. For example, memory device 110 may be a NAND or NOR flash memory that may be used for storing host and control data over the operational life of memory device 110. Memory device 110 may include multiple dies that may be divided into blocks to store the data and data may be stored in various formats, including, for example, SLC format, MLC format, TLC format, and/or QLC format. Data on memory device 110 stored in a format with fewer bits per cell may be accessed faster than data stored in a format with more bits per cell. As such, data stored in SLC memory (described in this case as the faster storage medium) may be accessed faster than data stored in MLC memory (described in this case as the slower storage medium), data stored in the MLC memory (described in this case as the faster storage medium) may be accessed faster than data stored in the TLC memory (described in this case as the slower storage medium), and so on. Data stored on memory device 110 may be accessed in a slower manner than data stored in RAM 106. As such, memory device 110 may be considered as a slower storage medium and RAM 106 (also referred to herein as a second storage media) may be considered as a faster storage medium. Memory device 110 may also include a vector database 112 and a search history database 114. For example, vector database 112 and search history database 114 may be stored in memory device 110a. Memory device 110 may be included in storage device 104 or may be otherwise communicatively coupled to storage device 104.

Controller 108 may also perform chunking on data, wherein controller 108 may break up or accumulate the host data into uniform-sized chunks before sending the data to memory device 110 for storage. Depending on the configuration of storage device 104, controller 108 may break up the host data into chunks of, for example, 4 KB, 8 KB, 16 KB, 32 KB, etc., or if the size of the host data is smaller than the set chunk size, controller 108 may accumulate the host data until it reaches the set chunk size and controller 108 may thereafter store the chunk of data on a block in memory device 110. To enable data searching using a semantic query, after the data is stored on memory device 110, the data may be processed through an embedding model to obtain vectors associated with the chunks of data stored on memory device 110. During the embedding process, if there is an interruption, the embedding process may be restarted using the data stored on memory device 110. The embedding process may be executed on any computing/acceleration resource. A vector resulting from the embedding process and representing a specific attribute or feature of a chunk of data stored on memory device 110 may be stored in vector database 112.

Host 102 may enable a semantic query wherein the semantic query may be sent to a LLM to search data stored in memory device 110 using text, audio, image, and the like. The LLM is typically trained on publicly available databases including, for example, Internet sources. If the semantic query is associated with publicly available information, the LLM may query an associated vector database 112 to obtain the proper vectors to respond to the semantic query. The query may also be embedded into vector database 112 and the query may be stored in search history database 114. Vector database 112 may include algorithms to index and query the embedded vectors in vector database 112. The algorithms in vector database 112 may execute a search (for example, an approximate nearest neighbor (AAN) search) to retrieve the N (N being an integer) closest vectors (i.e., the N most relevant vectors) and return those vectors to the LLM. The LLM may use the information obtained from vector database 112 to respond to the query, wherein the LLM may provide the data searched for and the relevant data associated with the data searched for.

To enable the LLM to properly respond to semantic searches on proprietary data, vector database 112 with vectors associated with proprietary data may be accessed by an application (referred to herein as an AI agent). When, for example, a user performs a semantic query using an application on host 102, the search may go through the AI agent on host 102. The AI agent may send the query to vector database 112 which may not be accessible to the LLM. The query may be embedded into vector database 112 and the query may be stored in search history database 114. Vector database 112 may retrieve and return the N most relevant information to the AI agent. The AI agent may send the user query prompt and the relevant information returned from vector database 112 to the LLM. The LLM may use the information obtained from the AI agent to respond to the query, wherein the LLM may provide the data searched for and the relevant data associated with the data searched for and the LLM may send a response to the user through the AI agent.

To accelerate data retrieval on storage device 104, controller 108 may organize how files are stored on various storage media using block/file level data retrieval (referred to herein as a first data retrieval) and semantic data retrieval (referred to herein as a second data retrieval). With the first data retrieval, controller 108 may accelerate data access by prefetching frequently accessed and/or recently used blocks from a persistent memory device to be cached in a faster storage medium. Controller 108 may also use the first data retrieval to identify frequently and/or recently accessed blocks to be moved from a slower storage medium, for example, MLC memory, to a faster storage medium, for example, SLC memory. As part of the first data retrieval, controller 108 may also use a file access hint sent from a top layer such as an application to move data associated with the hint from a slower storage medium to a faster storage medium or to prefetch the data from a persistent memory to be cached in a faster storage medium. As such, with the first data retrieval, controller 108 may identify hot blocks in memory device 110 based on the access history (i.e., identify blocks on memory device 110 that have been frequently and/or recently accessed and/or that are associated with a file access hint) in order for controller 108 to move the hot blocks into a storage medium that may be accessed faster than the storage medium on which the data is stored.

As part of the second/semantic data retrieval, controller 108 may organize how files may be accessed/stored based on the response from the LLM to a semantic search. For example, controller 108 may organize which files to cache in a faster storage medium based on a search history and the response from the LLM. Consider an example where the user performs a first semantic search for a beach and based on the first semantic search and the N most relevant vectors retrieved from vector database 112, the LLM retrieves file A and relevant files B-D; the user performs a second semantic search for a flower, and based on the second semantic search and the N most relevant vectors retrieved from vector database 112, the LLM retrieves file E and relevant files F-G; and the user performs a third semantic search for waves, and based on the third semantic search and the N most relevant vectors retrieved from vector database 112, the LLM retrieves file H and relevant files I-J. Using the vectors retrieved from vector database 112, the LLM may predict that in a subsequent query the user may possibly search for the sea which may be found in files A-D and H-J. Controller 108 may thus use the search history information obtained from search history database 114 and the results provided by the LLM to perform the semantic data retrieval. As part of the semantic data retrieval, controller 108 may identify the requested file and the associated relevant files. For example, based on the user behavior as provided in the search history, controller 108 may identify files A-D and H-J as hot data in memory device 110.

Controller 108 may also perform semantic data retrieval on the contents of a file. Consider an example where a movie is stored on memory device 110. The movie may be time-sequenced, and the size of the movie may be many gigabytes such that RAM 106 may not have sufficient space for controller 108 to cache the entire movie in RAM 106. When the movie is requested by host 102, controller 108 may cache a limited number of frames (for example, the first five frames in the movie) into RAM 106 to minimize interruptions associated with retrieving subsequent frames. Using the vectors in vector database 112, the LLM may perform offline analysis on the movie and identify frames in the movie including a specific attribute or feature. If, for example, a user performs a search for a scene in the movie, based on the search, the LLM may identify frames in the movie with relevant attributes or features. Using the user behavior as obtained from search history database 114 and the information provided by the LLM, controller 108 may retrieve the identified frames with relevant attributes or features from memory device 110.

Using, for example, a time stamp, user identification, and/or search query as input, controller 108 may execute the first data retrieval and the second data retrieval. As an output for the first data retrieval, controller 108 may retrieve/prefetch the hot blocks based on the access history. As an output for the second data retrieval, controller 108 may retrieve/prefetch the hot blocks including the requested data and the associated relevant data for a semantic query. Controller 108 may cache the prefetched hot blocks retrieved using the first and second data retrieval in a faster storage medium and/or move data retrieved using the first data retrieval and the second data retrieval from a slower storage medium to a faster storage medium.

The size of the faster storage medium may typically be smaller than the size of the slower storage medium. If, for example, controller 108 wants to cache data retrieved from memory device 110 in RAM 106 based on the output of the first data retrieval and the second data retrieval, given that the size of RAM 106 may likely be limited, controller 108 may cache a first amount of data from the first data retrieval and a second amount of data from the second data retrieval in RAM 106. Controller 108 may dynamically modify the first amount of data and the second amount of data. For example, if controller 108 determines that host 102 is accessing more files associated with the second data retrieval, controller 108 may dynamically decrease the first amount of data and increase the second amount of data so that more data from the second data retrieval may be cached in RAM 106. In another example, controller 108 may determine a first percentage of host hits on cached data associated with the first data retrieval and a second percentage of host hits on cached data associated with the second data retrieval. Controller 108 may dynamically adjust the first amount of data to correspond with the first percentage of host hits and the second amount of data to correspond with the second percentage of host hits.

The importance of files related to each search history may decrease with time. So a history window may be another parameter in the second data retrieval. For example, controller 108 may may cache the prefetched hot blocks within a history window retrieved using the second data retrieval in a faster storage medium and/or move data within the history window retrieved using the second data retrieval from a slower storage medium to a faster storage medium.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

FIG. 2 is a block diagram of a file on which semantic caching may be performed in accordance with some implementations. File 200 may include a video that may be divided into sixteen frames. The video may be time-sequenced, and the size of the video may be many gigabytes such that RAM 106 may not have sufficient space for controller 108 to cache the entire video in RAM 106. Using the vectors in vector database 112, the LLM may perform offline analysis of the video and identify frames in the video including a specific attribute or feature. For example, the LLM may identify scenes associated with a first actor, wherein based on the information provided by the LLM, controller 108 may identify frames 5-6, 10-11, and 15-16 (shown with a star) as being associated with the first actor. The LLM may identify scenes associated with a second actor, wherein based on the information provided by the LLM, controller 108 may identify frames 7-9 (shown with a circle) as being associated with the second actor. The LLM may also identify scenes associated with a third actor, wherein based on the information provided by the LLM, controller 108 may identify frames 12-14 (shown with a tear drop) as being associated with the third actor.

When a semantic search is performed for the video, controller 108 may cache frames 1-4 into RAM 106 to minimize interruptions associated with retrieving frames for the video. If, for example, a user performs a search for the first actor, using the user behavior as provided in search history database 114 and the information provided by the LLM, controller 108 may retrieve and cache the frames 5-6, 10-11, and 15-16 into a faster storage medium. As indicated above FIG. 2 is provided as an example. Other examples may differ from what is described in FIG. 2.

FIG. 3 is an example block diagram of a system including different storage media that may be organized according to an access history and user behavior in accordance with some embodiments. System 300 includes host 102 that may include an application 302 with an interface to receive a semantic query and a LLM 304. Host 102 may be communicatively coupled to storage device 104 which may include various storage media, including DRAM 106, one or more solid state drives (SSD) 306, and one or more hard disk drive (HDD) 308. Controller 108 may access DRAM 106 faster than controller 108 may access SSD 306, and controller 108 may access SSD 306 faster than controller 108 may access HDD 308. HDD 308 may be the least expensive memory and most of the data may be stored on HDD 308. Storage device 104 may also include vector database 112, search history database 114 and controller 108.

Controller 108 may organize how files are stored in storage media 106, 306 and 308 to accelerate data access. As such, controller 108 may obtain a time stamp, user identification, and/or search query as input to execute the first data retrieval and the second data retrieval. Controller 108 may prefetch a given amount of data based on the access history and prefetch a file requested through a semantic search and the associated relevant files for the requested file. Controller 108 may cache the prefetched data in a faster storage medium or move the data to a fast storage medium. For example, controller 108 may cache prefetched data from SSD 306 to DRAM 106, move prefetched data from HDD 308 to SSD 306, and/or cache prefetched data from HDD 308 to DRAM 106. After a while, controller 108 may move stale data from a faster storage medium to a slower storage medium. For example, to free up space on SSD 306 after performing subsequent first data retrieval and the second data retrieval, controller 108 may move data from SSD 306 to HDD 308. Controller 108 may thus organize the file storage on storage device 104 based on the user behavior as identified by the semantic search history and access history. As indicated above FIG. 3 is provided as an example. Other examples may differ from what is described in FIG. 3.

FIG. 4 is another example block diagram of a system including different storage media that may be organized according to an access history and user behavior in accordance with some embodiments. System 400 may include cloud infrastructure 402 with multiple computing/storage nodes 408A-408N (referred to generally as computing nodes 408), a content delivery network 404, and a management node 406. The computing nodes 408 may be used to store data and content delivery network 404 be used to store frequently accessed content. Management node 406 may capture the search histories of multiple users and may execute an algorithm to execute the first data retrieval and second data retrieval such that data may be cached into content delivery network 404 based on the access history and the users' behavior as identified by the semantic search history stored in management node 406. As indicated above FIG. 4 is provided as an example. Other examples may differ from what is described in FIG. 4.

FIG. 5 is an example flow diagram for organizing how files are stored on various storage media using block/file level data retrieval and semantic data retrieval in accordance with some implementations. At 510, controller 108 may use a time stamp, user identification, and/or search query as input to execute the first data retrieval and the second data retrieval. At 520, controller 108 may execute the first data retrieval and identify hot blocks based on an access history on storage device 104. At 530, controller 108 may execute the second data retrieval based on a semantic search history and identify hot blocks including a requested file and the associated relevant files for one or more semantic searches. At 540, controller 108 may prefetch a first number of hot blocks obtained from the first data retrieval and a second number of data obtained from the second data retrieval. At 550, controller 108 may cache the prefetched hot blocks and dynamically modify the first number of data and the second number of data to optimize how hot data is cached in the faster storage medium. At 560, controller 108 may move data into and out of the faster storage medium according to data retrieved via subsequent executions of the first data retrieval and the second data retrieval. As indicated above FIG. 5 is provided as an example. Other examples may differ from what is described in FIG. 5.

FIG. 6 is a diagram of an example environment in which systems and/or methods described herein are implemented. As shown in FIG. 6, Environment 600 may include hosts 102a-102n (referred to herein as host(s) 102), and one or more storage devices 104a-104n (referred to herein as storage device(s) 104). Storage device 104 may include a controller 108 to organize how files are stored on various storage media using block/file level data retrieval and semantic data retrieval. Hosts 102 and storage devices 104 may communicate via Non-Volatile Memory Express (NVMe) over peripheral component interconnect express (PCI Express or PCIe), SD, or the like.

Devices of Environment 600 may interconnect via wired connections, wireless connections, or a combination of wired and wireless connections. For example, the network in FIG. 6 may include NVMe over Fabric (NVMe-oF) Internet Small Computer Systems Interface (iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of Environment 600 may perform one or more functions described as being performed by another set of devices of Environment 600.

FIG. 7 is a diagram of example components of one or more devices of FIG. 1. In some implementations, host 102 may include one or more devices 700 and/or one or more components of device 700. Device 700 may include, for example, a communications component 705, an input component 710, an output component 715, a processor 720, a storage component 725, and a bus 730. Bus 730 may include components that enable communication among multiple components of device 700, wherein components of device 700 may be coupled to be in communication with other components of device 700 via bus 730.

Input component 710 may include components that permit device 700 to receive information via user input (e.g., keypad, a keyboard, a mouse, a pointing device, and a network/data connection port, or the like), and/or components that permit device 700 to determine the location or other sensor information (e.g., an accelerometer, a gyroscope, an actuator, another type of positional or environmental sensor). Output component 715 may include components that provide output information from device 700 (e.g., a speaker, display screen, and network/data connection port, or the like). Input component 710 and output component 715 may also be coupled to be in communication with processor 720.

Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 may include one or more processors capable of being programmed to perform a function. Processor 720 may be implemented in hardware, firmware, and/or a combination of hardware and software.

Storage component 725 may include one or more memory devices, such as random-access memory (RAM 106), read-only memory (ROM), and/or another type of dynamic or static storage device (e.g., a flash memory, a magnetic memory, and/or optical memory) that stores information and/or instructions for use by processor 720. A memory device may include memory space within a single physical storage device or memory space spread across multiple physical storage devices. Storage component 725 may also store information and/or software related to the operation and use of device 700. For example, storage component 725 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 705 may include a transceiver-like component that enables device 700 to communicate with other devices, such as via a wired connection, a wireless connection, or a combination of wired and wireless connections. The communications component 705 may permit device 700 to receive information from another device and/or provide information to another device. For example, communications component 705 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 705 may also include one or more broadband and/or narrowband transceivers and/or other similar types of wireless transceiver configurable to communicate via a wireless network for infrastructure communications. Communications component 705 may also include one or more local area network or personal area network transceivers, such as a Wi-Fi transceiver or a Bluetooth transceiver.

Device 700 may perform one or more processes described herein. For example, device 700 may perform these processes based on processor 720 executing software instructions stored by a non-transitory computer-readable medium, such as storage component 725. As used herein, the term "computer-readable medium" refers to a non-transitory memory device. Software instructions may be read into storage component 725 from another computer-readable medium or from another device via communications component 705. When executed, software instructions stored in storage component 725 may cause processor 720 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to organize data on different storage media to accelerate data retrieval on the storage device, the storage device comprises:
   a first storage media to store data in a persistent state, the first storage media being at least a NAND or NOR memory device;
   a second storage media to store data, the second storage media being a storage media that is accessed faster than the first storage media and the second storage media being a random-access memory; and
   a controller to execute a first data retrieval to identify hot blocks in the first storage media based on an access history, execute a second data retrieval to identify the hot blocks in the first storage media based on a semantic search, prefetch the hot blocks identified using the first data retrieval and the second data retrieval from the first storage media, and at least one of cache prefetched blocks in the second storage media and move data retrieved using the first data retrieval and the second data retrieval from a slower storage medium to a faster storage medium.

2. The storage device of claim 1, further comprising a vector database to store vectors, wherein a vector represents one of a specific attribute of data stored on the first storage media and a semantic query.

3. The storage device of claim 1, further comprising a search history database to store queries executed with via semantic searches.

4. The storage device of claim 1, wherein the first data retrieval includes identifying at least one of frequently accessed blocks and recently accessed blocks to be moved from a slower storage media to a faster storage media.

5. The storage device of claim 1, wherein the first data retrieval includes using a file access hint to prefetch data from the first storage media to be cached on the second storage media.

6. The storage device of claim 1, wherein the second data retrieval includes using semantic search history information and results from the semantic search to identify the hot blocks in the first storage media.

7. The storage device of claim 1, wherein the second data retrieval includes using semantic search history information and results from the semantic search to identify data with a specific attribute in a file.

8. The storage device of claim 1, wherein the controller uses at least one of a time stamp, a user identification, and search query as input to execute the first data retrieval and the second data retrieval.

9. The storage device of claim 1, wherein as output for the second data retrieval, the controller identifies a requested data and associated relevant data for a semantic query.

10. The storage device of claim 1, wherein the controller caches a first amount of data from the first data retrieval and a second amount of data from the second data retrieval into the second storage media and dynamically modifies the first amount of data and the second amount of data.

11. A method in a storage device for organizing data on different storage media to accelerate data retrieval on the storage device, the storage device comprises a controller to execute the method comprising:

executing a first data retrieval to identify hot blocks in a first storage media based on an access history;

executing a second data retrieval to identify the hot blocks in the first storage media based on a semantic search;

prefetching the hot blocks identified using the first data retrieval and the second data retrieval from the first storage media; and at least one of caching prefetched hot blocks in a second storage media that is accessed faster than the first storage media and moving data retrieved using the first data retrieval and the second data retrieval from a slower storage medium to a faster storage medium.

12. The method of claim 11, further comprising using a search history database to store queries executed via semantic searches.

13. The method of claim 11, wherein executing the first data retrieval further comprises at least one of:

identifying at least one of frequently accessed blocks and recently accessed blocks to be moved from a slower storage media to a faster storage media, and using a file access hint to identify data stored on the first storage media to be cached on the second storage media.

14. The method of claim 11, wherein executing the second data retrieval includes using semantic search history information and results from the semantic search to identify the hot blocks in the first storage media.

15. The method of claim 11, wherein executing the second data retrieval includes using semantic search history information and results from the semantic search to identify data with a specific attribute in a file.

16. The method of claim 11, further comprising using at least one of a time stamp, a user identification, and search query as input to execute the first data retrieval and the second data retrieval.

17. The method of claim 11, further comprising identifying requested data and associated relevant data for a semantic query as output for the second data retrieval.

18. The method of claim 11, further comprising caching a first amount of data from the first data retrieval and a second amount of data from the second data retrieval into the second storage media and dynamically modifying the first amount of data and the second amount of data.

19. A method in a storage device for organizing data on different storage media to accelerate data retrieval on the storage device, the storage device comprises a controller to execute the method comprising:

executing a first data retrieval to identify hot blocks in a first storage media based on an access history;

executing a second data retrieval to identify the hot blocks in the first storage media based on a semantic search;

prefetching the hot blocks identified using the first data retrieval and the second data retrieval from the first storage media;

at least one of caching a first amount of data from the first data retrieval and a second amount of data from the second data retrieval in a second storage media that is accessed faster than the first storage media and moving data retrieved using the first data retrieval and the second data retrieval from a slower storage medium to a faster storage medium; and dynamically adjusting the first amount of data and the second amount of data being cached in the second storage media.

20. The method of claim 19, further comprising at least one of caching the second amount of data within a history window and moving the second amount of data within the history window from a slower storage medium to a faster storage medium.

* * * * *